US010956751B2

(12) United States Patent
Shinohe (10) Patent No.: US 10,956,751 B2
(45) Date of Patent: Mar. 23, 2021

(54) VESSEL MONITORING APPARATUS

(71) Applicant: CANON KABUSHIKI KAISHA, Tokyo (JP)

(72) Inventor: Koji Shinohe, Singapore (SG)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 16/320,958

(22) PCT Filed: Jul. 21, 2017

(86) PCT No.: PCT/JP2017/026461
§ 371 (c)(1),
(2) Date: Jan. 25, 2019

(87) PCT Pub. No.: WO2018/021181
PCT Pub. Date: Feb. 1, 2018

(65) Prior Publication Data
US 2019/0163984 A1  May 30, 2019

(30) Foreign Application Priority Data

Jul. 29, 2016 (JP) .............................. JP2016-150341

(51) Int. Cl.
*G06K 9/00* (2006.01)
*H04N 7/18* (2006.01)
(Continued)

(52) U.S. Cl.
CPC ........ *G06K 9/00771* (2013.01); *G06T 7/0002* (2013.01); *G06T 7/292* (2017.01);
(Continued)

(58) Field of Classification Search
CPC ............. G06K 9/00771; G06K 9/6407; G06K 9/2009; G06K 9/6423; G06K 2209/27;
(Continued)

(56) References Cited

U.S. PATENT DOCUMENTS 6,269,175 B1 * 7/2001 Hanna ....................... G06T 5/50
382/107
6,993,158 B2 * 1/2006 Cho ....................... G01S 3/7865
348/169
(Continued)

FOREIGN PATENT DOCUMENTS

JP    2001-281331 A    10/2001
JP    2008-282067 A    11/2008
(Continued)

*Primary Examiner* — Amir Alavi
(74) *Attorney, Agent, or Firm* — Canon U.S.A., Inc., IP Division (57) ABSTRACT

The present invention provides an external apparatus connected to an imaging apparatus over a network, the imaging apparatus including an imaging unit which captures an image of a vessel being a subject, the external apparatus including an obtaining unit which obtains image data including the vessel captured by the imaging unit, a display unit which displays the image data, an analyzing unit which extracts vessel estimation information regarding an arbitrary vessel included in the image data based on the image data, a receiving unit which receives vessel information based on a wireless communication from the vessel, and a comparing unit which compares the vessel estimation information and the vessel information, wherein, in a case where the vessel estimation information and the vessel information are not matched, the display unit displays a warning in addition to the image data.

9 Claims, 10 Drawing Sheets

(51) Int. Cl.
  *G06T 7/00* (2017.01)
  *G06T 7/292* (2017.01)
(52) U.S. Cl.
  CPC ......... *H04N 7/181* (2013.01); *G06K 2209/27* (2013.01); *G06T 2207/10016* (2013.01); *G06T 2207/30232* (2013.01)
(58) Field of Classification Search
  CPC . H04N 7/181; G06F 17/30249; G06T 7/0002; G06T 7/292; G06T 7/001; G06T 2207/30232; G06T 2207/10016
  See application file for complete search history.

(56) References Cited

U.S. PATENT DOCUMENTS

| | | | |
|---|---|---|---|
| 8,411,969 B1 | 4/2013 | Joslin et al. | |
| 8,611,595 B2 * | 12/2013 | Son | G06T 7/215 382/103 |
| 9,299,000 B2 * | 3/2016 | Ikeda | G06K 9/46 |
| 9,386,209 B2 * | 7/2016 | Kim | G06K 9/00798 |
| 9,740,942 B2 * | 8/2017 | Yamaguchi | G06K 9/00798 |
| 10,187,630 B2 * | 1/2019 | Yoo | G06T 7/285 |
| 10,611,495 B2 * | 4/2020 | McNeill | G01S 17/89 |
| 2001/0036307 A1 * | 11/2001 | Hanna | H04N 13/25 382/154 |
| 2013/0158865 A1 * | 6/2013 | Na | G01C 21/005 701/448 |
| 2015/0241560 A1 | 8/2015 | Lee | |
| 2019/0163984 A1 * | 5/2019 | Shinohe | H04N 7/181 |

FOREIGN PATENT DOCUMENTS

| | | |
|---|---|---|
| JP | 2010-03274 A | 1/2010 |
| JP | 2010-160626 A | 7/2010 |
| JP | 2016-85612 A | 5/2016 |

* cited by examiner

VESSEL MONITORING APPARATUS

CROSS-REFERENCE TO RELATED APPLICATIONS

This application is a National Phase application of International Application No. PCT/JP2017/026461, filed Jul. 21, 2017, which claims the benefit of Japanese Patent Application No. 2016-150341, filed Jul. 29, 2016. The disclosures of the above-named applications and patent are hereby incorporated by reference herein in their entirety.

TECHNICAL FIELD

The present invention relates to a monitoring apparatus and, in particular, it relates to a vessel monitoring apparatus for maritime monitoring.

BACKGROUND ART

For purpose of prevention of nuisance, smuggling, and illegal entries of suspicious vessels, visual vessel monitoring has been performed in the past. However, visual vessel monitoring has a problem of poor visibility under a bad weather or during night time. Many vessels passing through a narrow strait may cause a state of intensive congestion, because of which it is difficult to sufficiently monitor all vessels entering into a predetermined field of view.

In order to solve the problem, for example, PTL 1 discloses a technology for aiding visual monitoring by using a translucent display apparatus to present vessel information regarding a radar or an automatic ship identification system (hereinafter, AIS) to the field of view of a human who is performing vessel monitoring. This technology can facilitate visual vessel detection under conditions with poor visibility.

An AIS (automatic ship identification system) is a mechanism for mutual communication of the type of vessel, the position of a vessel, a course, a speed, a destination, a cargo, etc. by using radio waves in a VHF band between neighboring vessels and a land station for safe sailing of vessels on the ocean.

CITATION LIST

Patent Literature

PTL 1: Japanese Patent Laid-Open No. 2010-03274

SUMMARY OF INVENTION

The present invention provides an external apparatus connected to an imaging apparatus over a network, the imaging apparatus including an imaging unit configured to capture an image of a vessel being a subject, the external apparatus including an obtaining unit configured to obtain image data including the vessel captured by the imaging unit, a display unit configured to display the image data, an analyzing unit configured to extract vessel estimation information regarding an arbitrary vessel included in the image data based on the image data, a receiving unit configured to receive vessel information based on a wireless communication from the vessel, and a comparing unit configured to compare the vessel estimation information extracted by the analyzing unit and the vessel information received by the receiving unit, wherein, in a case where the vessel estimation information and the vessel information are not matched in the comparing unit, the display unit displays a warning in addition to the image data.

DESCRIPTION OF EMBODIMENTS

Figure 1:
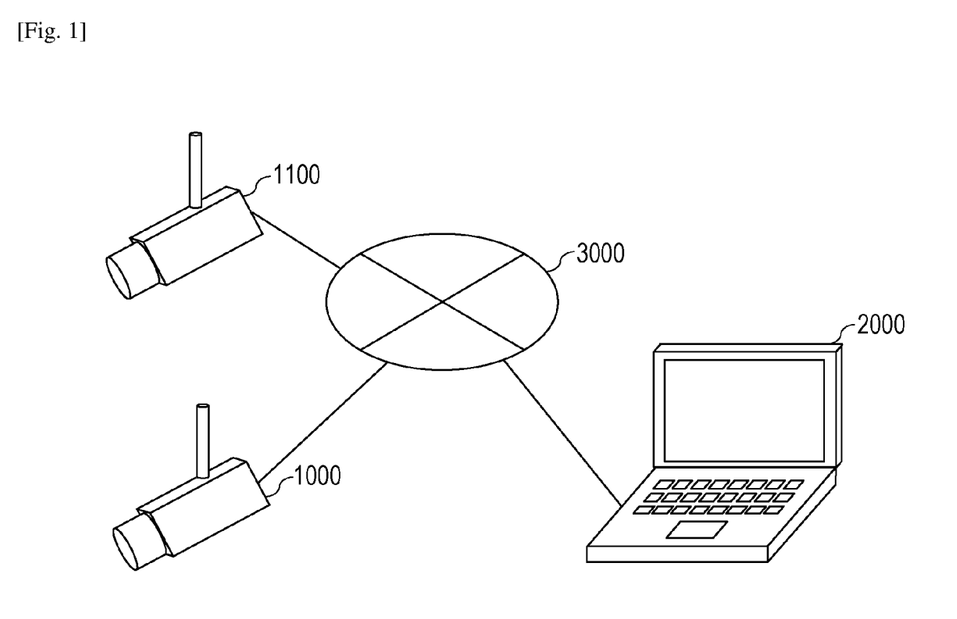
FIG. 1 is a network configuration diagram including a configuration of a monitoring camera according to an embodiment of the present invention.

Embodiments of the present invention will be described in detail with reference to the attached drawings. FIG. 1 illustrates a monitoring system including a vessel monitoring apparatus according to an embodiment of the present invention.

First Embodiment

With reference to FIG. 1, a system configuration which performs communication over a network according to a first embodiment will be described below. According to this embodiment, a vessel monitoring apparatus configured to monitor a vessel corresponds to an imaging apparatus, and may be a monitoring camera capable of distributing an image over a network, for example.

FIG. 1 is a system configuration diagram including a monitoring camera 1000 corresponding to a vessel monitoring apparatus. A client apparatus 2000 corresponds to an external apparatus according to the present invention. The monitoring camera 1000, a monitoring camera 1100, and the client apparatus 2000 are mutually communicably connected over a network 3000. The client apparatus 2000 may transmit a command relating to a camera control to the monitoring camera 1000. The monitoring camera 1000 may transmit a response to the command and captured image data to the client apparatus 2000. The client apparatus 2000 according to this embodiment is an exemplary external apparatus such as a PC. The monitoring system according to this embodiment corresponds to an imaging system.

Because the monitoring camera 1000 and the monitoring camera 1100 have the same configuration, any repetitive descriptions will be omitted. The monitoring system according to this embodiment may include a plurality of monitoring cameras in addition to the monitoring camera 1000 and the monitoring camera 1100. A monitoring system according to this embodiment, such as a monitoring camera, may be partially or entirely mounted at a part fixed to the ground, such as a lighthouse, or may be mounted to a moving object within a vessel. Instead of the apparatus illustrated in FIG. 1, a recorder configured to record image data or an analysis apparatus configured to detect an object in recorded image data may be provided, for example.

The network 3000 may include a plurality of routers, switches, and cables that satisfy a communication standard such as Ethernet (registered trademark). However, according to this embodiment, the network may be based on any communication standard, size and configuration if the monitoring camera 1000 and the client apparatus 2000 can communicate with each other over the network.

For example, the network 3000 may be configured by the Internet, a wired LAN (Local Area Network), a wireless LAN, or a WAN (Wide Area Network). The monitoring camera 1000 according to this embodiment may support PoE (Power Over Ethernet (registered trademark)), for example, and may receive electric power through a LAN cable.

Figure 2:
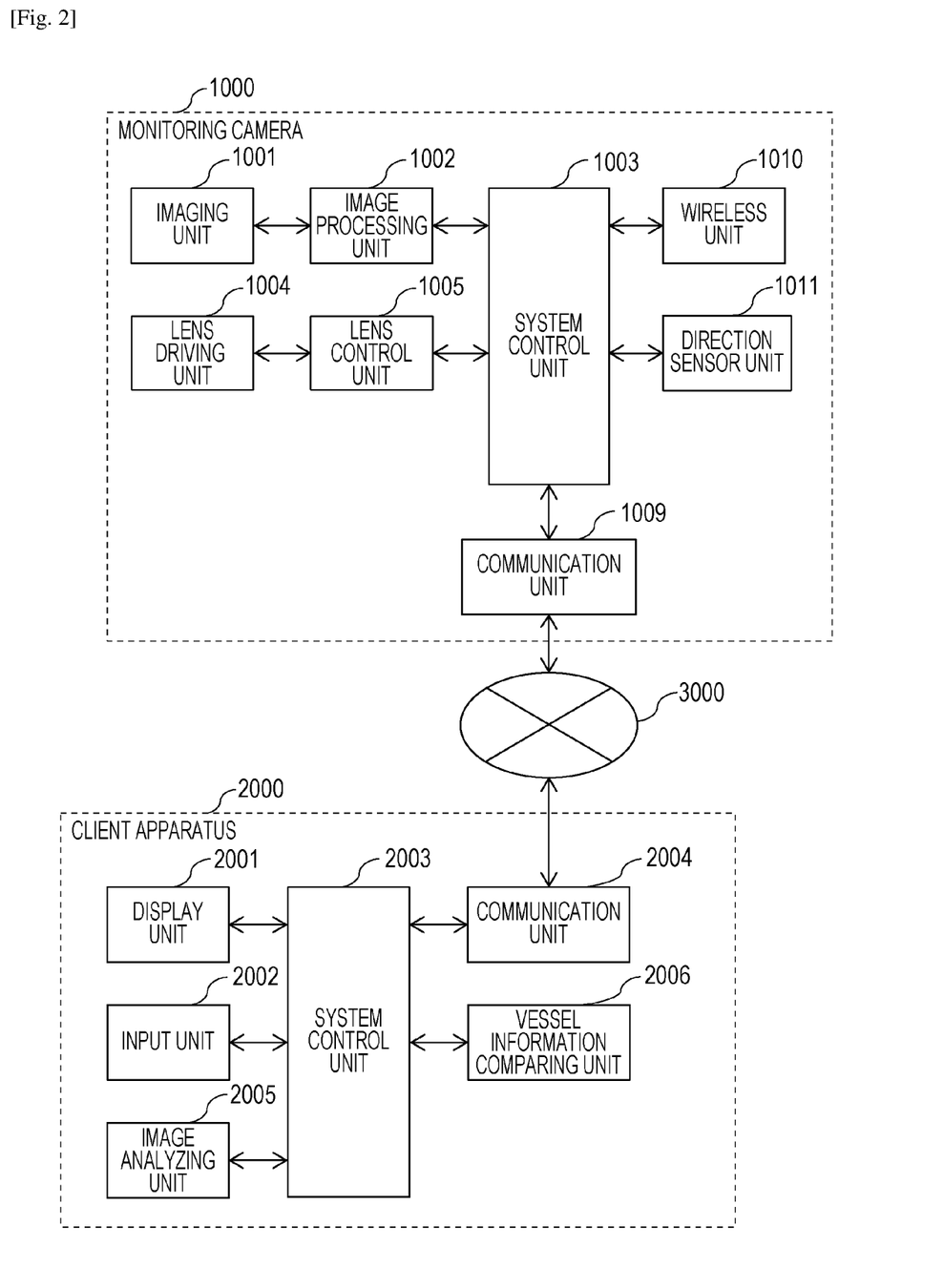
FIG. 2 is a function block diagram and a system configuration diagram of a monitoring camera and a client apparatus according to an embodiment of the present invention.

FIG. 2 illustrates a functional block configuration diagram and a system configuration diagram of the monitoring camera 1000 and the client apparatus 2000 according to this embodiment. FIG. 2 illustrates the monitoring camera 1000, the client apparatus 2000, and the network 3000. The monitoring camera 1000 includes an imaging unit 1001, an image processing unit 1002, a system control unit 1003, a lens driving unit 1004, a lens control unit 1005, a communication unit 1009, a wireless unit 1010, and a direction sensor 1011. FIG. 2 further illustrates a display unit 2001, an input unit 2002, a system control unit 2003, a communication unit 2004, an image analyzing unit 2005, and a vessel information comparing unit 2006. The monitoring camera 1000 and the client apparatus 2000 are mutually communicably connected over the network 3000.

With reference to FIG. 2, the components of the monitoring camera 1000 and their functions will be described.

The imaging unit 1001 includes a lens unit having a plurality of optical elements and an imaging device such as a CCD and a CMOS. The imaging unit is configured to capture an image of a subject in an angle-of-view range depending on lens settings defined by the system control unit 1003 and to convert the captured signal to an electric signal.

The image processing unit 1002 is configured to perform a predetermined image process and compression coding processing on an image signal captured by the imaging unit 1001. The processed image signal is output as image data.

The monitoring camera 1000 according to this embodiment controls the imaging unit 1001 and the image processing unit 1002 based on imaging conditions defined through the client apparatus 2000 or automatically determined by the monitoring camera 1000. Here, the imaging conditions may include an imaging gain condition, a gamma condition, a dynamic range condition, an exposure condition, a focus control setting, and a compression coding setting, for example.

The system control unit 1003 analyzes a camera control command received from the client apparatus 2000, for example, over the network 3000 and processes it based on the command. For example, the system control unit 1003 may instruct the image processing unit 1002 to perform image quality adjustment and may instruct the lens control unit 1005 to perform zooming or focus control. The system control unit 1003 includes a CPU to generally control the configuration elements in the monitoring camera 1000 and define parameters therefor. The system control unit 1003 further includes a memory to and from which data can be written and be deleted electrically and executes a program stored therein. The memory may be usable as a region for storing a program to be executed by the system control unit 1003, a work region in which a program is being executed, and a region for storing data. A timer unit, not illustrated, may be provided to give a time stamp to obtained data.

The lens driving unit 1004 is configured to drive the lens unit included in the imaging unit 1001 based on a control performed by the lens control unit 1005. The lens unit included in the imaging unit 1001 may include a drive system including a zooming mechanism, a focus mechanism, a vibration-proofing mechanism, a diaphragm mechanism, a shutter mechanism, and a motor for driving the drive system. Set values and conditions for lens controls to be performed by the lens control unit 1005 may be set and controlled by the system control unit 1003.

The communication unit 1009 may properly packet-process the obtained image data and distribute the processed image data to the client apparatus 2000 over the network 3000. The communication unit 1009 may receive a camera control command transmitted from the client apparatus 2000, perform a proper packet process, and transmit it to the system control unit 1003. A response to the received command may be transmitted to the client apparatus 2000. Information regarding an AIS and a GPS obtained by the wireless unit 1010 and information regarding operations performed in the monitoring camera 1000 may be transmitted.

The wireless unit 1010 includes an antenna unit configured to receive electromagnetic waves to be used by an AIS and a global positioning system (hereinafter, GPS) from a vessel. A signal received by the antenna unit is output to the system control unit 1003 after properly processed. The wireless unit 1010 may include an antenna unit supporting different kinds of wireless communication. A wireless communication unit may be provided for mutual communication with another monitoring camera 1100, for example.

The direction sensor 1011 may include, for example, a geomagnetic sensor and a gyrosensor and can detect the direction in which the monitoring camera 1000 captures an image. After that, the direction sensor 1011 outputs information (direction information) regarding the direction of capturing to the system control unit 1003. The direction sensor 1011 can calculate not only the direction of capturing but also the distance to the object to be captured.

Information obtained by the wireless unit 1010 and the direction sensor 1011 may be transmitted to the client 2000 over the network 3000 and is to be used by the image analyzing unit 2005. Having described that the wireless unit 1010 and direction sensor 1011 are included in the monitoring camera 1000 according to this embodiment, embodiments of the present invention are not limited thereto. Direction information obtained by the wireless unit 1010 and the direction sensor 1011 may be obtained through the communication unit 1009 from an apparatus connected to the network 3000.

With reference to FIG. 2, the components of the client apparatus 2000 and functions thereof will be described. The client apparatus 2000 may typically be a general-purpose computer such as a personal computer.

The display unit 2001 may be a liquid crystal display device, for example, and may be configured to display an image obtained from the monitoring camera 1000 and to display a graphic user interface (hereinafter, GUI) for controlling the camera.

The input unit 2002 may be a pointing device such as a keyboard, a mouse, and a touch panel, and a user operating the client apparatus 2000 may operate the GUI through the input unit 2002.

The communication unit 2004 is configured to receive image data from the monitoring camera 1000 over the network 3000. The communication unit 2004 is further configured to transmit a camera control command to the monitoring camera 1000 and receive a response to the command. The communication unit 2004 is configured to receive information regarding the monitoring camera 1000, such as GPS information and direction information.

The system control unit 2003 is configured to receive information from the image analyzing unit 2005, which will be described below, and the vessel information comparing unit 2006, which will be described below. The system control unit 2003 is further configured to synthesize information from the vessel information comparing unit and image data from the monitoring camera 1000 and display the result on the display unit 2001. The system control unit 2003 is configured to generate a camera control command based on a user's GUI operation and transmit it to the monitoring camera 1000 through the communication unit 2004. The system control unit 2003 includes a CPU to generally control the configuration elements in the client apparatus 2000 and define parameters therefor. The system control unit 2003 further includes a memory to and from which data can be written and be deleted electrically and may execute a program stored therein. The memory may be usable as a region for storing a program to be executed by the system control unit 2003, a work region in which a program is being executed, and a region for storing data. A timer unit, not illustrated, may be provided to give a time stamp to obtained data. Data within the memory may also be read and written by the image analyzing unit 2005 and the vessel information comparing unit 2006, which will be described below.

The image analyzing unit 2005 is configured to analyze image data in the system control unit 2003 to recognize a vessel and extract a feature amount. As an example, from the extracted feature amount of a vessel, the image analyzing unit 2005 may calculate the name of the vessel written on the body of the vessel, the size of the vessel, and a draft. The image analyzing unit 2005 may receive information regarding the monitoring camera 1000 and information regarding the direction of capturing from the wireless unit 1010 and the direction sensor 1011 in the monitoring camera 1000 over the network 3000. Generally from the information and the analysis result of the image data, the position of the vessel to be captured on a map, the sailing speed and the direction of sailing may be calculated. Then, the image analyzing unit 2005 may output the direction calculation result as vessel estimation information to the system control unit 2003.

The image analyzing unit 2005 may only use image data to calculate vessel estimation information such as the name of the vessel. However, template matching may be performed between the image data and images and feature information regarding vessels, which are prestored in the memory to calculate the name of the vessel as a result. The vessel estimation information may include the names of a plurality of vessels as candidates instead of the name of a specific vessel.

The vessel information comparing unit 2006 compares the vessel information (the name of the vessel, the size of the vessel, a draft, the position, the sailing speed, the sailing method, etc.) obtained by the AIS and the vessel estimation information obtained from the image analyzing unit 2005 to determine a mismatch.

According to this embodiment, the wireless unit 1010 configured to receive electromagnetic waves to be used for the AIS and the GPS is included in the monitoring camera 1000. However, the wireless unit 1010 may be included in the client apparatus 2000. Alternatively, it may be included in both of the monitoring camera 1000 and the client apparatus 2000 or may be provided as a separate apparatus. In a case where the AIS is included in the client apparatus 2000, the installed position of the monitoring camera 1000 may be obtained in advance from GPS information, for example.

According to this embodiment, the image analyzing unit 2005 and the vessel information comparing unit 2006 are included in the client apparatus 2000. However, they may be included in the monitoring camera 1000. Alternatively, it may be included in both of the monitoring camera 1000 and the client apparatus 2000 or may be provided as a separate apparatus.

Over the network 3000, the client apparatus 2000, as described above, can obtain an image captured by the monitoring camera 1000, obtain information regarding a vessel, and perform a camera control.

Here, to use the AIS, an object apparatus included in a vessel is powered on, and sailing information is input when leaving from a port. The information to be included is information (sailing information) input by a user for each sailing and may include a draft, a type of loaded dangerous article, a destination, and a destination arrival time. Information (dynamic information) to be input automatically may be a latitude and a longitude, an accuracy of position, a clock time, a course over ground, a sailing speed over ground, a heading, a rate of turn, and a sailing status. Information (static information) to be set only upon installation of the apparatus may include vessel identification, identification number (hereinafter, called MMSI), a call sign, a vessel name, an IMO number (number inherent to an individual vessel), a hull length and width, a vessel type, and an antenna position.

Radio waves to be used for an AIS may have a VHF (156 MHz to 174 MHz) so that automatic communication can be performed between vessels and between a vessel and a land station to exchange information. According to this embodiment, AIS information corresponds to vessel information.

The wireless unit 1010 in the monitoring camera 1000 can obtain information from all vessels present around the monitoring camera 1000. Thus, the AIS information can be obtained independently of the imaging range of the monitoring camera 1000, and the information can be obtained from a vessel outside the imaging range. The monitoring camera 1000 according to this embodiment can transmit the AIS information to the client apparatus 2000 selectively over the network 3000 to improve identifiability of the type of vessel in the client apparatus 2000. More specifically, the angle-of-view range can be determined from the GPS information obtained by the wireless unit 1010, the direction information obtained by the direction sensor 1011, and lens settings defined by the lens control unit 1005. A vessel present in the determined angle-of-view range is determined based on the GPS information in the vessel included in the AIS information. Therefore, the vessel included in the angle-of-view range can be identified. Transmitting the AIS information regarding the identified vessel to the client apparatus 2000 over the network 3000 can not only reduce the network load and can improve the identifiability of the type of vessel in the client apparatus 2000.

Figure 3:
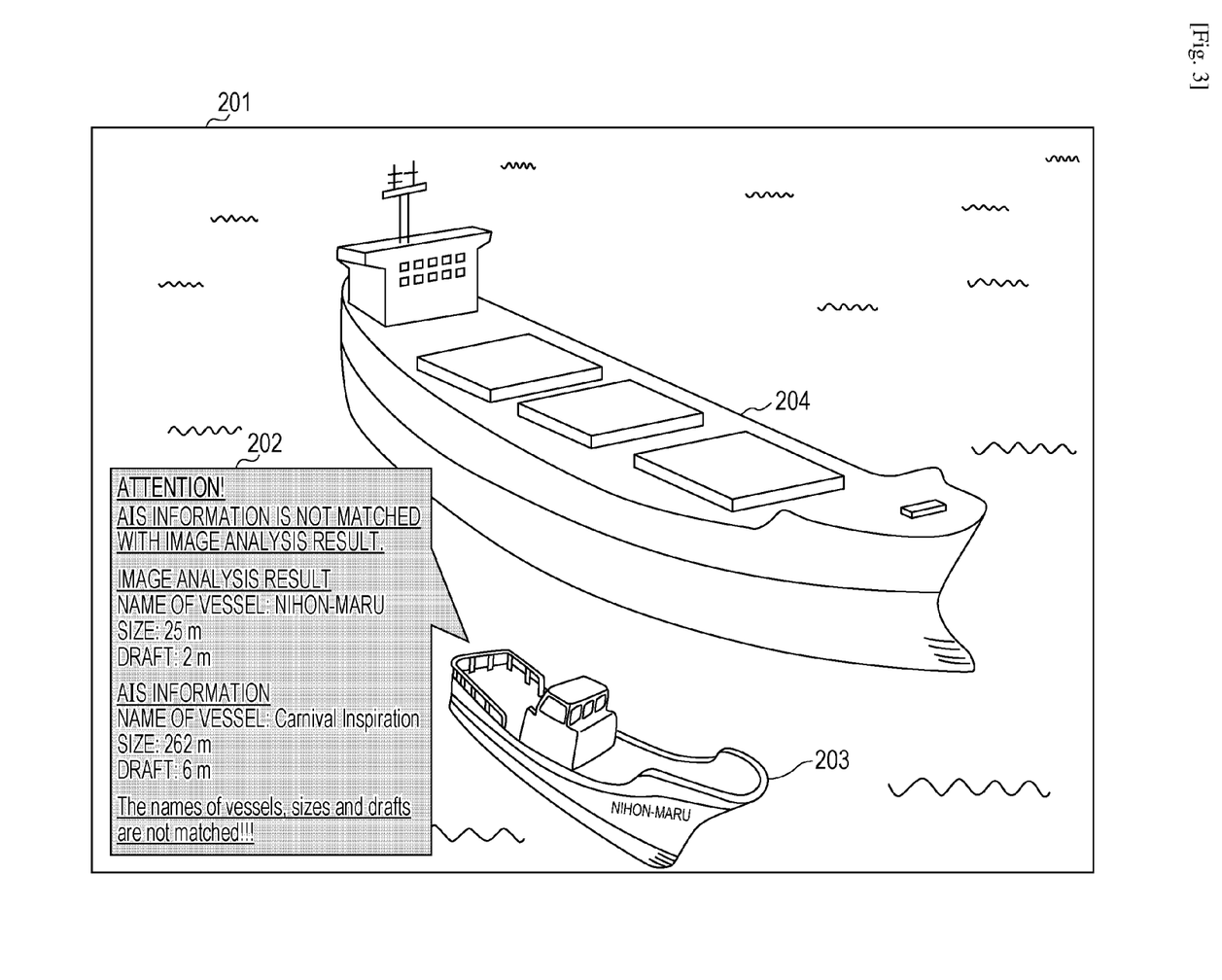
FIG. 3 is a diagram illustrating a method for displaying a warning against a suspicious vessel according to an embodiment.

With reference to FIG. 3, a method will be described for displaying a captured image and a warning as a part of an application display screen displayed on the display unit 2001 in the client apparatus 2000 according to an embodiment of the present invention.

An exemplary image display 201 is captured by the monitoring camera 1000 and is displayed on the display application screen presented on the display unit 2001. Captured vessels 203 and 204 are present on the sea.

Warning information 202 is displayed along with the captured vessel 203. The vessel information comparing unit 2006 compares vessel information from the AIS and vessel estimation information analyzed by the image analyzing unit 2005. If the two vessel information pieces are not matched as a result of the comparison, the vessel information comparing unit 2006 outputs mismatch information to the system control unit 2003. The system control unit 2003 synthesizes the captured images and details of the mismatch and displays the result as warning information 202 near the captured vessel 203. For example, according to this embodiment, a video captured by the monitoring camera 1000 is analyzed, from which results can be obtained that the name of the captured vessel 203 is NIHON-MARU, the size is 25 m, and a draft is 2 m. However, from the AIS information, vessel information representing a vessel name of Carnival Inspiration, a size of 262 m, and a draft of 6 m are obtained. Because the vessel names, the sizes, and the drafts are not matched as a result of the comparison, these kinds of information are displayed as warning information 202.

Figure 4:
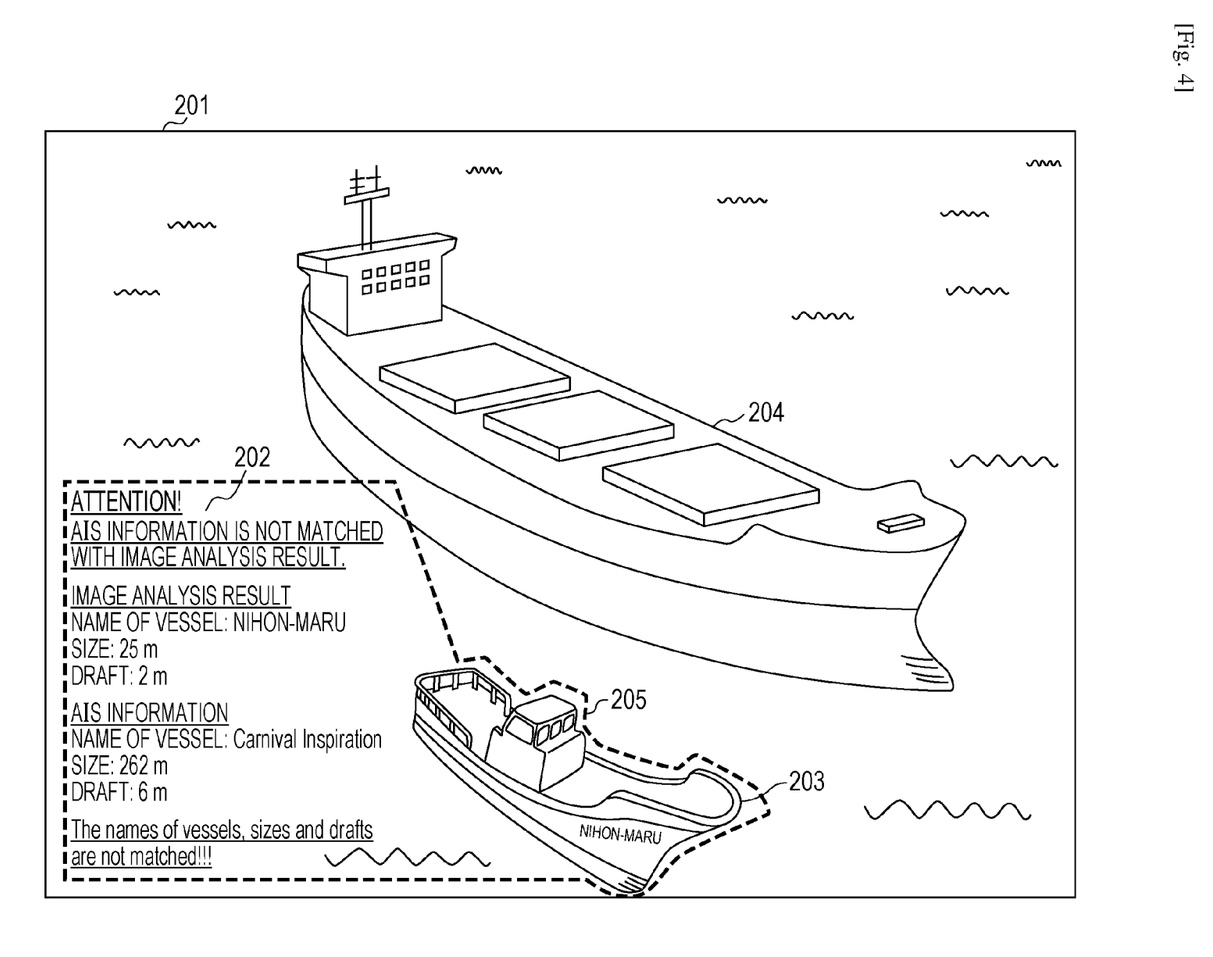
FIG. 4 is a diagram illustrating a method for displaying a warning against a suspicious vessel according to an embodiment.
Figure 5:
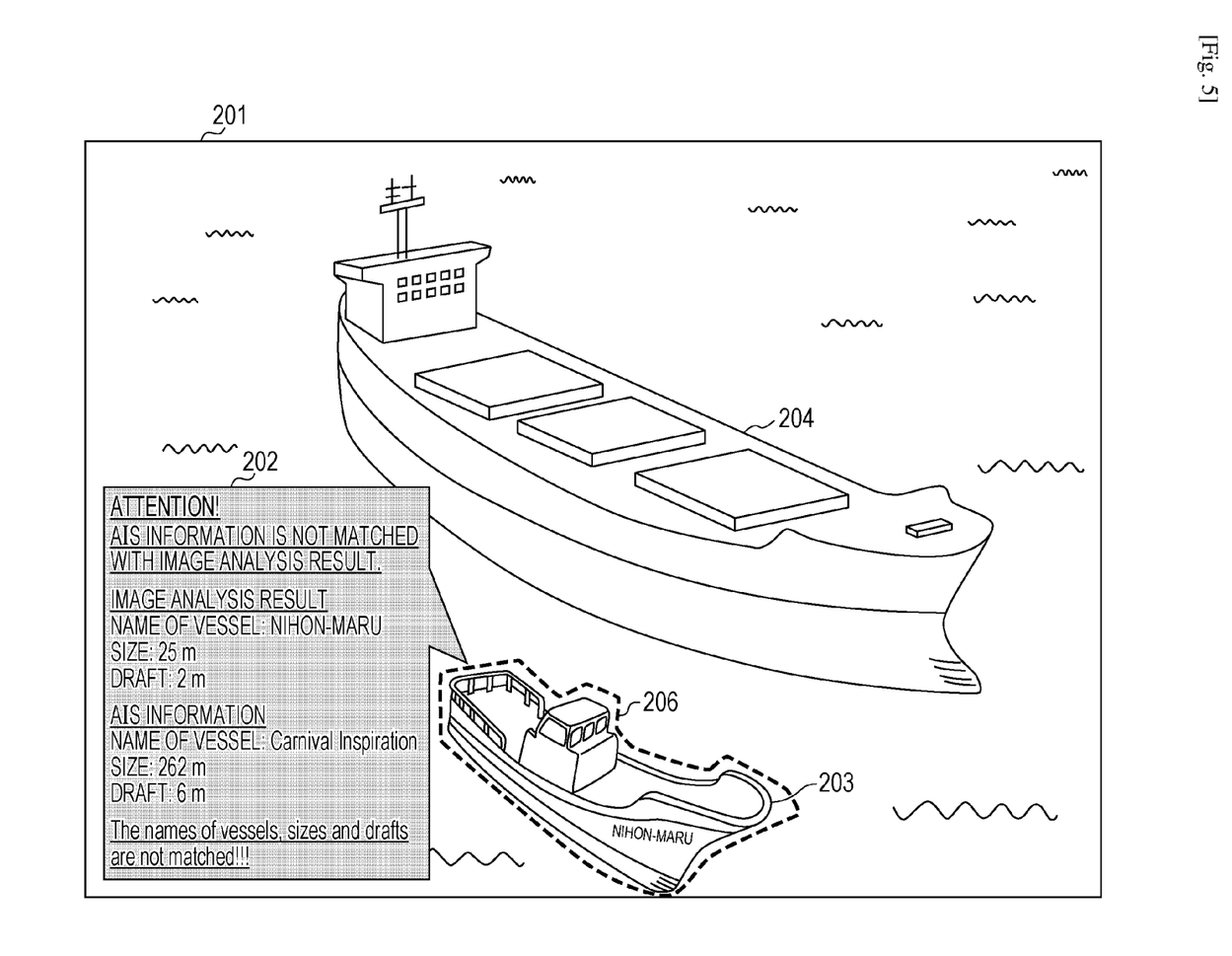
FIG. 5 is a diagram illustrating a method for displaying a warning against a suspicious vessel according to an embodiment.

According to this embodiment, a balloon is displayed to represent that the warning information 202 is associated with the vessel 203. However, the method for indicating the association is not limited to the balloon type representation, but the association may be indicated by using an arrow. As illustrated in FIG. 4, the association may simultaneously be displayed within a frame 205 including a captured vessel. As illustrated in FIG. 5, the associated vessel 203 may be displayed around the frame 206, and the frame may be indicated by a balloon or an arrow.

Effects of the warning display will be described below. In a harbor area, a suspicious vessel may be pretended as a legal vessel by disguising its AIS information to cause a deplorable event. By comparing AIS information and a result of an image analysis according to this embodiment, the disguise of a suspicious vessel can be detected, and attention of a guard can be attracted. A difference in draft may be judged to determine whether there is overloading or false declaration of a cargo type or not.

Figure 6:
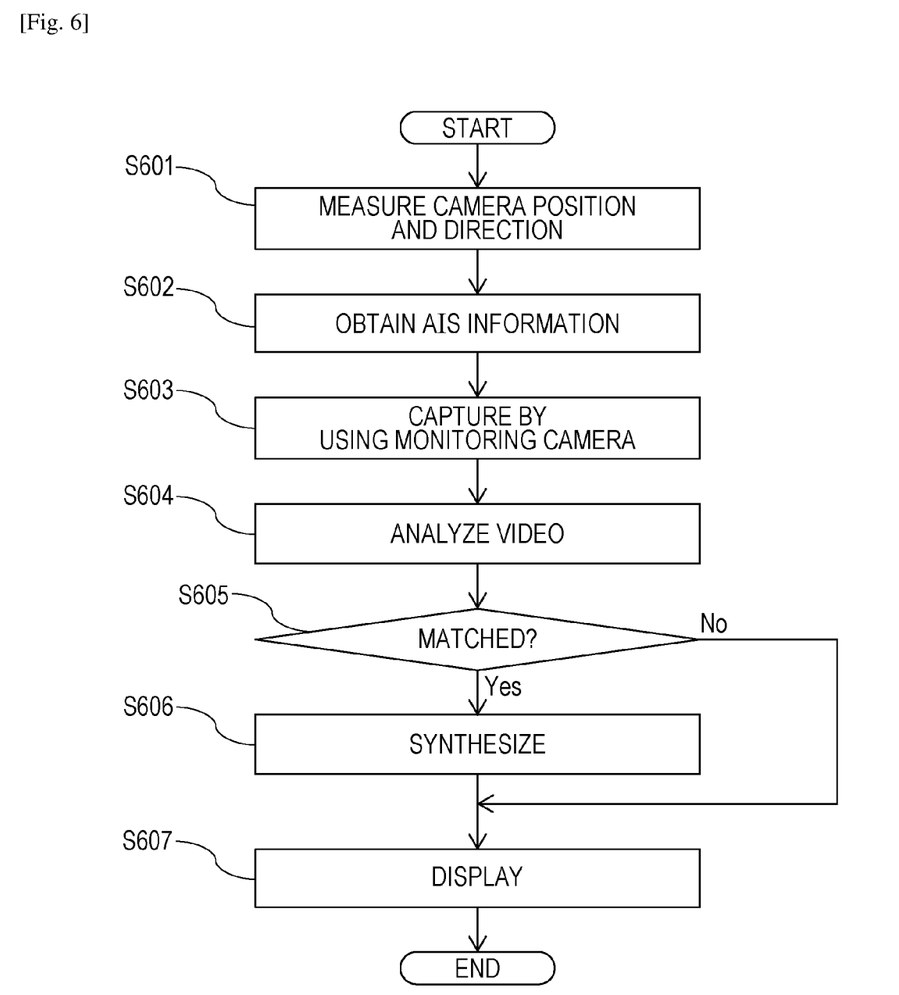
FIG. 6 is a flowchart illustrating processing details for displaying a warning against a suspicious vessel according to an embodiment.

Next, details of processing for displaying a warning based on image data and AIS information according to this embodiment will be described with reference to FIG. 6. The processing illustrated on the flowchart in FIG. 6 is performed by the system control unit 2003 in the client apparatus 2000.

In step S601, the system control unit 2003 obtains GPS information regarding the monitoring camera 1000 obtained by the wireless unit 1010 in the monitoring camera 1000 over the network 3000. The direction information regarding the monitoring camera 1000 obtained by the direction sensor 1011 is also obtained. The processing then moves to step S602.

In step S602, the system control unit 2003 obtains AIS information obtained by the wireless unit 1010 in the monitoring camera 1000 over the network 3000. The vessel name, coordinates, size, draft, and sailing speed of a vessel in an imaging range of the monitoring camera 1000 are stored in the memory. The processing then moves to step S603.

The type of AIS information regarding a vessel within an imaging range may be selected by the monitoring camera 1000 as described above, or the same processing may be performed within the client apparatus 2000.

In step S603, the system control unit 2003 obtains image data captured by the imaging unit 1001 in the monitoring camera 1000 and stores it in the memory over the network 3000. The processing moves to step S604.

In step S604, the system control unit 2003 inputs the image data obtained in step S603 to the image analyzing unit 2005. The image analyzing unit 2005 analyzes the input image data to detect a vessel and calculate a vessel name, a size, a draft and so on. The image analyzing unit 2005 calculates the position on a map of the monitoring camera 1000 obtained in step S601, the direction of capturing, and the analysis result of the image data to calculate the position on the map of the vessel and the sailing speed. According to this embodiment, the vessel name, the size, the draft, the position on a map of the vessel, the sailing speed, etc. correspond to the image analysis result being a result of an analysis of an image performed by the image analyzing unit 2005. The processing then moves to step S605.

In step S605, the system control unit 2003 inputs the AIS information obtained in step S602 and the image analysis result obtained in step S604 to the vessel information comparing unit 2006 to compare them. If they are not matched as a result of the comparison, the processing moves to step S606. If they are matched, the processing moves to step S607.

In step S606, the system control unit 2003 synthesizes the information (mismatch information) representing that the information pieces are determined as not matched in step S605 to the image data obtained by the monitoring camera 1000. The synthesizing may include synthesizing the mismatch information to a neighborhood of the vessel determined as being not matched as illustrated in FIGS. 3 to 5 for easy identification of association between the vessel and the mismatch information. The processing then moves to step S607.

In step S607, if they are not matched in step S605, the system control unit 2003 displays the video synthesized in step S606 on the display unit 2001. If they are matched in step S605, the display unit 2001 displays the image captured in step S603. Then, the processing ends.

Having described the example that an image is only displayed if the information pieces are matched in step S605, it may be configured such that whether the AIS information is to be displayed or not may be set to enable the AIS information to be displayed in response to a user's operation. In a case where a user enables the setting for displaying the AIS information, and if there is a mismatch in step S605, the AIS information may be displayed in a distinguishable manner such as displayed in a changed color or blinking.

If there is a mismatch in step S605, the system control unit 2003 instructs the monitoring camera 1000 over the network 3000 to define an exposure setting and a focus control setting for the mismatched vessel by priority.

Second Embodiment

According to the first embodiment, an exemplary warning display is presented which can be image-analyzed by the monitoring camera 1000. However, under a bad weather, it may sometimes be difficult to perform such an image analysis on a vessel. Under a bad weather, an image analysis may be performed to detect the bad weather, and the result may be reflected to the method for warning display for improved effects of the warning.

Like numbers refer to like parts through the first and second embodiments, and any repetitive description will be omitted. Because the system configuration which performs communication over the network 3000 according to this embodiment is the same as the one illustrated in FIG. 1 according to the first embodiment, any repetitive description will be omitted.

Figure 7:
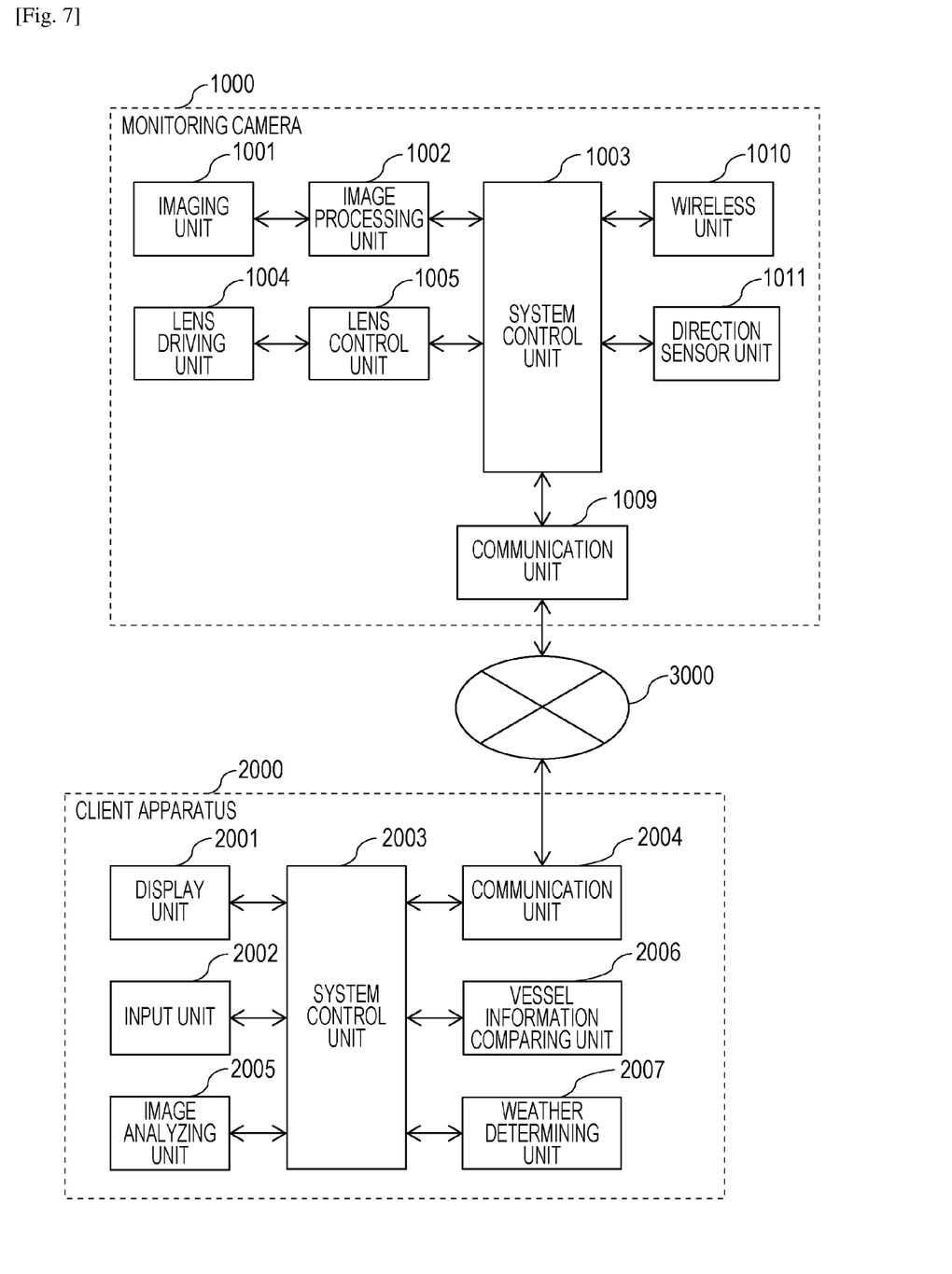
FIG. 7 is a function block diagram and a system configuration diagram of a monitoring camera and a client apparatus according to an embodiment of the present invention.

FIG. 7 illustrates a functional block configuration diagram and a system configuration diagram of the monitoring camera 1000 and the client apparatus 2000 according to this embodiment.

In the client apparatus 2000, a weather determining unit 2007 is configured to perform an image analysis on image data stored in a memory in the system control unit 2003, detect the presence or absence of rain, snow, fog, and determine the weather. The determination result is output to the system control unit 2003. Because the rest of the configuration is the same as that of the first embodiment, any repetitive description will be omitted.

Figure 8:
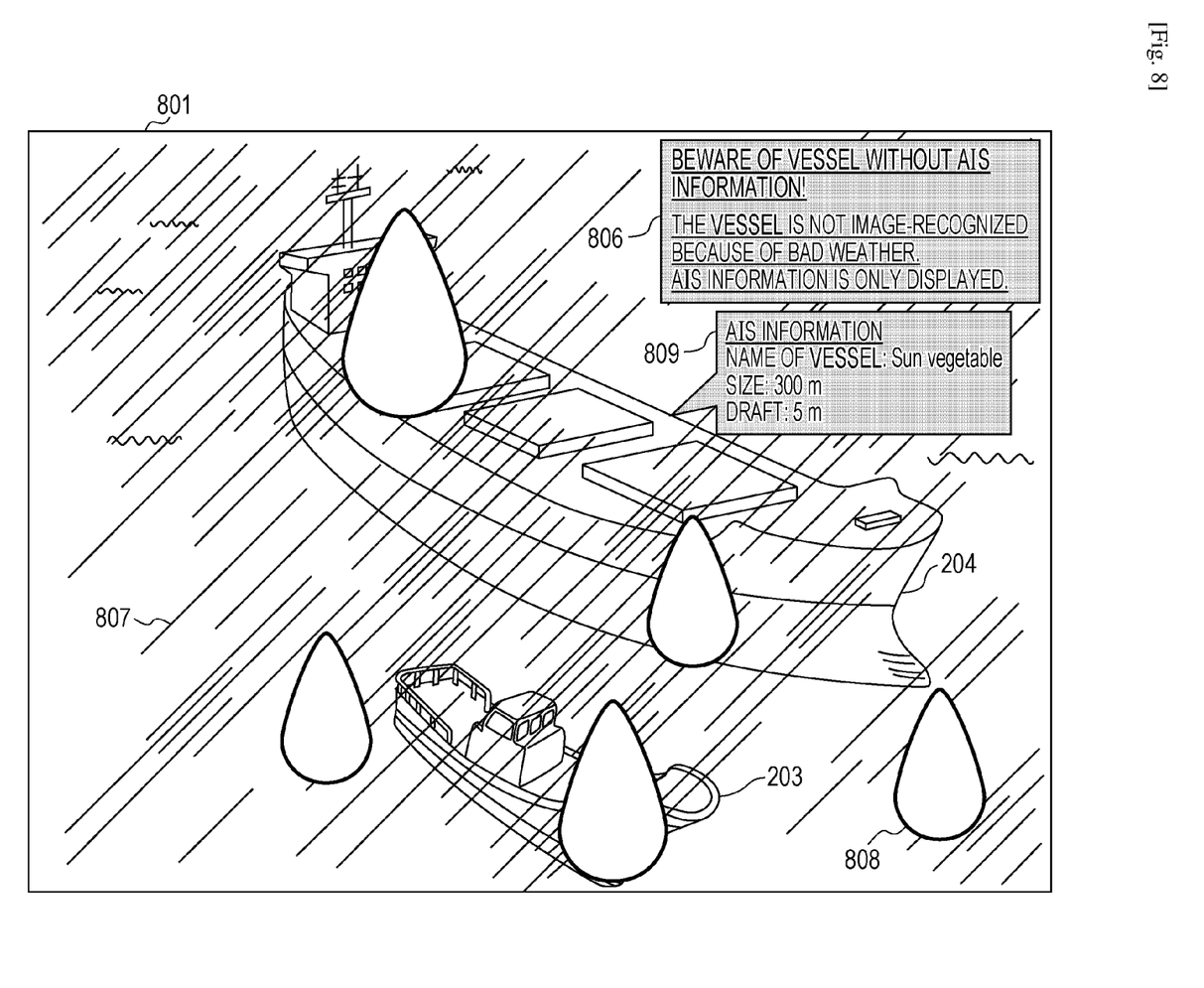
FIG. 8 is a flowchart illustrating processing details for displaying a warning against a suspicious vessel according to an embodiment.

With reference to FIG. 8, a method for displaying a captured image and a warning on the display unit 2001 in the client apparatus 2000 according to this embodiment of the present invention will be described below.

FIG. 8 illustrates an exemplary image display 801 captured by the monitoring camera 1000 under the rainy weather and displayed on the display unit 2001. FIG. 8 further illustrates captured vessels 203 and 204 on the sea.

FIG. 8 illustrates rain 807 and water droplets 808 on a lens surface of the monitoring camera 1000.

A presentation 806 displays a determination result provided by the weather determining unit 2007 and indicates that it is a bad weather and that special attention may be required to a vessel for which AIS information is not displayed.

AIS information 809 is displayed along with the vessel 204.

The image analyzing unit 2005 is configured to identify on a map a range to be captured by the monitoring camera 1000 based on information obtained from the wireless unit 1010 and the direction sensor 1011. The AIS information contains positional information regarding the vessel. Under a bad weather, the image analyzing unit 2005 can estimate that a vessel is present in the imaging range from the imaging range on the map and the AIS information even when the image analysis detects no vessel. In a case where the image analyzing unit 2005 estimates the presence of a vessel under a bad weather, the system control unit 2003 displays the AIS information 809 at a position on the display screen where the vessel is being captured.

Thus, if the weather determining unit 2007 determines a bad weather, no vessel is detected by the image analysis. Instead, based on the estimation of the image analyzing unit 2005, mismatch information is displayed with respect to all vessels which should be in the field of view of the monitoring camera 1000.

Under a bad weather, turbulence on an image may sometimes prevent an image analysis from detecting a vessel. However, a human may visually recognize a vessel on the image. In this case, for easy discovery of a suspicious vessel, AIS information is displayed in neighborhood of a vessel having AIS information. Thus, a vessel without having AIS information can be easily recognized by a human conversely. Many vessels of suspicious vessels do not have AIS information at all, and there is a high possibility that a vessel for which AIS information is not displayed is a suspicious vessel. The representation 806 of bad weather details and the AIS information 809 are displayed so that special attention can be attracted to a vessel without AIS information conversely.

Figure 9:
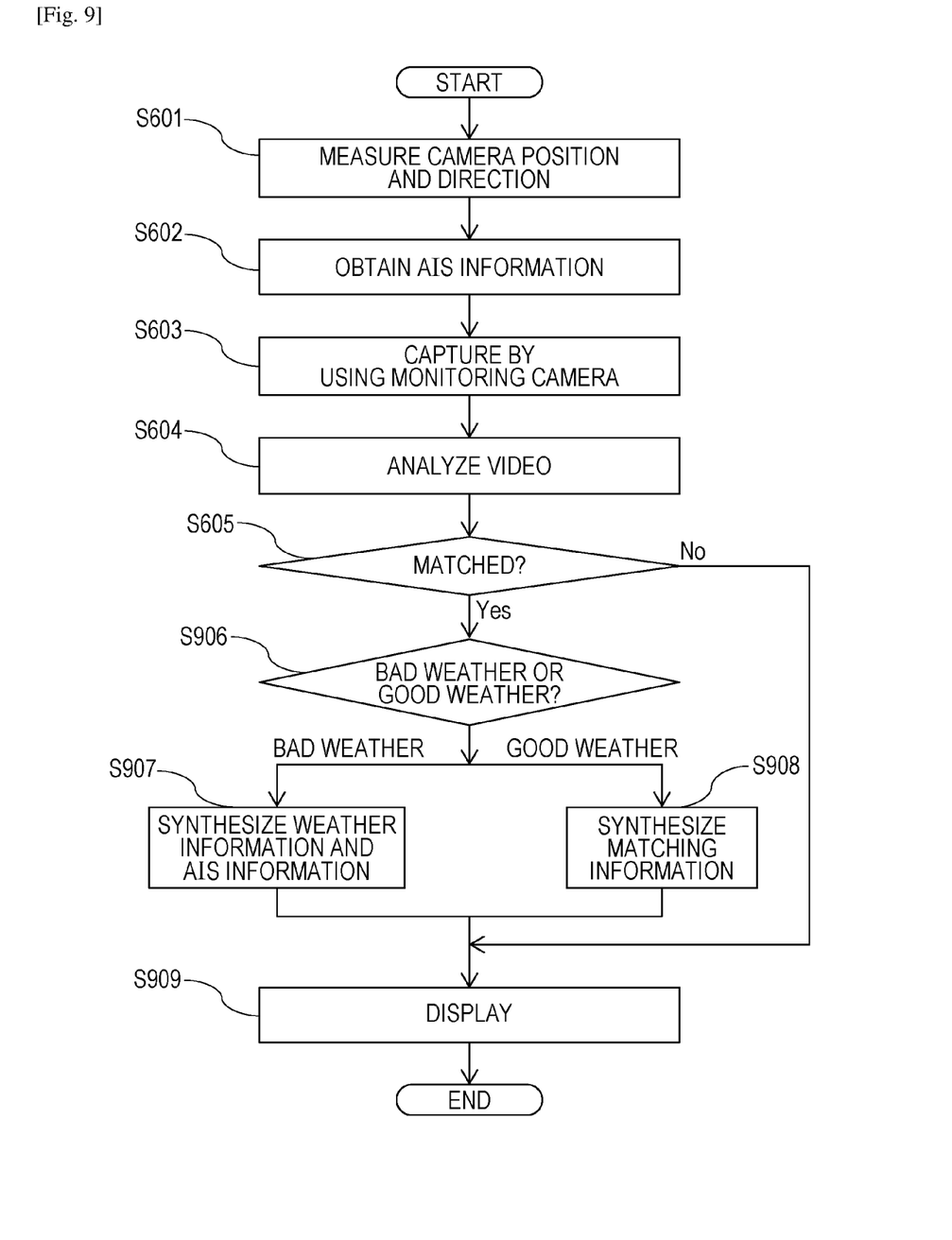
FIG. 9 is a flowchart illustrating processing details for displaying a warning against a suspicious vessel according to an embodiment.

Next, with reference to FIG. 9, processing details for displaying a warning based on image data and AIS information will be described with respect to details of processing for displaying a warning according to this embodiment. The processing on the flowchart illustrated in FIG. 9 is performed by the system control unit 2003 in the client apparatus 2000. Because the processing in steps S601 to S605 is the same as the processing on the flowchart in FIG. 6, any repetitive description will be omitted.

In step S906, the system control unit 2003 inputs image data to the weather determining unit 2007 to perform an image analysis. A bad weather such as rainy and foggy is detected as an analysis result therefrom. If a bad weather is judged as an analysis result, the processing moves to step S907. If a good weather is judged, the processing moves to step S908.

In step S907, the system control unit 2003 synthesizes an indication of a bad weather, the AIS information of the vessel, and an image captured by the monitoring camera 1000. The processing then moves to step S909.

In step S908, the system control unit 2003 synthesizes the information that it is determined in step S605 that there is a mismatch (hereinafter, mismatch information) with the image captured by the monitoring camera 1000. The processing then moves to step S909. The processing corresponds to the processing in step S606 in FIG. 6.

In step S909, the system control unit 2003 displays the image synthesized in step S907 or step S908 on the display unit 2001. This processing corresponds to the processing in step S607 in FIG. 6.

According to the aforementioned first embodiment and second embodiment, the operation for comparing obtained image data and AIS information, for example. The objects to be compared are not limited thereto. Because similar vessels may often be objects to be monitored, image data obtained and recorded in the past may be searched based on AIS information, and the image data may also be an object of the comparison.

Image data pieces obtained from both of the monitoring camera 1000 and the monitoring camera 1100 may also be objects of the comparison. Increasing the number of objects of the comparison can improve the reliability of displayed information. Objects other than vessels may also be monitored. For example, moving objects such as an airplane, an automobile, and a drone may also be monitored. Also in a case where a moving object excluding a vessel is to be monitored, moving object information (such as a destination, a destination arrival time period, a present position, a moving speed, an identification number, a moving object name, a length and a width of the moving object, color, and model) regarding the appearance of the moving object may be received from the moving object through wireless communication to perform the monitoring as described above. The wireless communication system is not limited to those using a VHF band but may be based on a generally used wireless standard.

Embodiments Relating to Network Communication

The monitoring camera 1000 according to the present invention is connected to the client apparatus 2000 over the network 3000. The client apparatus 2000 can transmit over the network 3000 a control command for controlling the monitoring camera 1000 over the network 3000. The monitoring camera 1000 controls itself based on a received control command and a parameter included in the control command. When the monitoring camera 1000 receives a control command, the monitoring camera 1000 transmits a response to the received command to the client apparatus 2000. The client apparatus 2000 receiving the response from the monitoring camera 1000 updates details of a user interface displayed on a display unit provided in the client apparatus 2000 based on information included in the response.

Figure 10:
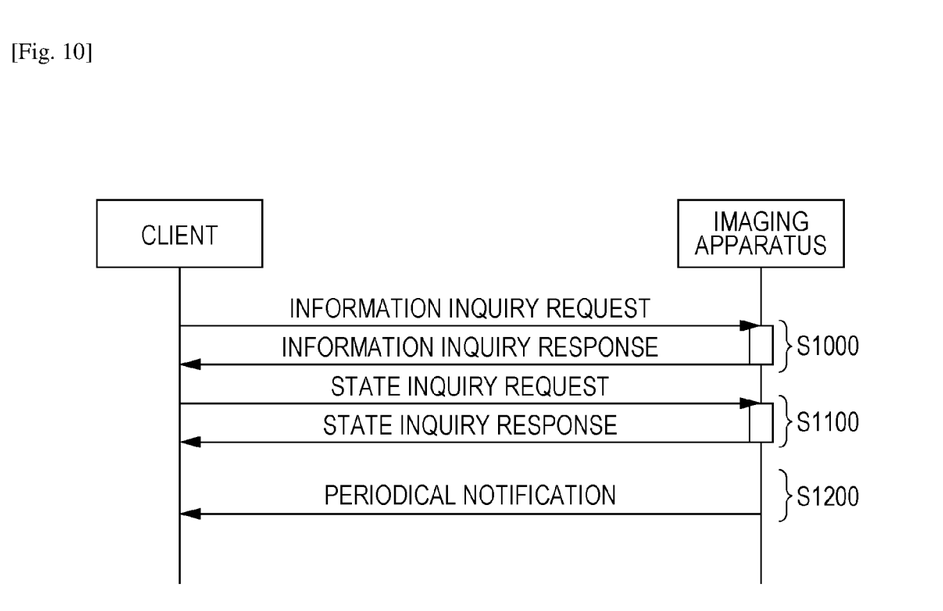
FIG. 10 is a diagram illustrating communication over a network according to an embodiment.

Communication associated with a control command between the monitoring camera 1000 and the client apparatus 2000 will be described below with reference to FIG. 10. The client apparatus 2000 and the monitoring camera 1000 communicate through transactions including a combination of requests and responses.

First, the client apparatus 2000 may transmit information request for obtaining information held in the monitoring camera 1000 in Transaction S1000. The information request can include a request for inquiry about a function that the monitoring camera 1000 has, for example. Here, the monitoring camera 1000 may have functions including parameters for compression coding processing to be performed on an image, an image correction function, and the presence or absence of a pan-tilt mechanism. The monitoring camera 1000 may further have functions including setting information regarding a function applying AIS information and direction information, for example.

The monitoring camera 1000 may then transmit an information request response as a response to the information request. The information request response internally includes information regarding a function of the monitoring camera 1000 requested by the client apparatus 2000. By using the information, the client apparatus 2000 can recognize the function of the monitoring camera 1000.

The client apparatus 2000 further can obtain the state of the monitoring camera 1000 by using the information request. Here, the state of the monitoring camera 1000 may include the current control parameter and the position of the pan-tilt mechanism, for example. The state of the monitoring camera 1000 may include the currently obtained AIS information. By using these information pieces, the client apparatus 2000 can recognize the state of the monitoring camera 1000.

The client apparatus 2000 in Transaction 51100 transmits a setting request for setting parameters to the monitoring camera 1000. The setting request is issued in consideration of the function or state of the monitoring camera 1000 obtained in Transaction S1000 in advance. For example, those settable by using a setting request may include a parameter for performing compression coding on an image, an image correction function, and an operation for the pan-tilt mechanism.

The monitoring camera 1000 may transmit a setting response as a response to the setting request. The setting response internally includes information regarding whether normal setting is defined for a function of the monitoring camera 1000 set from the client apparatus 2000 or not, for example. By using these information pieces, the client apparatus 2000 can recognize the state of the monitoring camera 1000.

Based on the settings from the client apparatus 2000, the monitoring camera 1000 is triggered by a periodical or predetermined event to transmit a periodical notification to the client apparatus 2000 in Transaction S1200. The periodical notification may include the currently obtained AIS information as data included in the information request response. By using these information pieces, the client apparatus 2000 can recognize the state of the monitoring camera 1000. More specifically, in a case where the client apparatus 2000 needs to obtain AIS information, the client apparatus 2000 can inquire of the monitoring camera 1000. These kinds of information may be written as meta data regarding image data distributed by the monitoring camera 1000.

Other Embodiments

The present invention can be realized by processing performed by a program for implementing one or more functions of the aforementioned embodiments, which is supplied to a system or an apparatus over a network or through a storage medium and is read and executed by one or more processors in a computer in the system or the apparatus. The present invention can be realized by a circuit (such as an ASIC) which implements one or more functions.

Having described embodiments of the present invention, the present invention is not limited to the embodiments, and various changes, modifications and alterations can be made without departing from the spirit and scope thereof.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-150341, filed Jul. 29, 2016, which is hereby incorporated by reference herein in its entirety.

The invention claimed is:

1. An external apparatus connected to an imaging apparatus over a network, the imaging apparatus including an imaging unit configured to capture an image of a moving object being a subject, the apparatus comprising a computer executing instructions that, when executed by the computer, cause the computer to function as:
- an obtaining unit configured to obtain image data including the moving object captured by the imaging unit;
- a display unit configured to display the image data;
- an analyzing unit configured to extract estimation information regarding the moving object included in the image data based on the image data;
  - a receiving unit configured to receive moving object information via a wireless communication from the moving object; and
  - a comparing unit configured to compare the estimation information extracted by the analyzing unit and the moving object information received by the receiving unit,
  - wherein, in a case where the estimation information and the moving object information are not matched in the comparing unit, the display unit displays a warning in addition to the image data.

2. The external apparatus according to claim 1, wherein the receiving unit directly obtains moving object information from the moving object through a wireless communication.

3. The external apparatus according to claim 1, wherein execution of the instructions further cause the computer to function as a weather determining unit configured to determine a weather surrounding the imaging apparatus from the image obtained by the obtaining unit.

4. The external apparatus according to claim 3, wherein the display unit displays a warning based on a determination result provided by the weather determining unit in a case where the estimation information and the moving object information are not matched in the comparing unit.

5. The external apparatus according to claim 1, wherein the analyzing unit includes analysis by template matching.

6. The external apparatus according to claim 1, wherein the moving object is a vessel, and the wireless communication includes a communication in an automatic vessel identification system from an automatic vessel identification apparatus.

7. The external apparatus according to claim 1, wherein the moving object is any one of a vessel, an airplane, an automobile, and a drone.

8. An imaging system comprising an external apparatus connected to an imaging apparatus over a network, and the imaging apparatus including an imaging unit configured to capture an image of a vessel being a subject,
- the imaging apparatus having a computer executing instructions that, when executed by the computer, cause the computer to function as
- a transmitting unit configured to transmit image data including the vessel captured by the imaging unit to the external apparatus over the network,
- the external apparatus including a computer executing instructions that, when executed by the computer, cause the computer to function as
- a display unit configured to display the image data transmitted from the imaging apparatus;
- an analyzing unit configured to extract estimation information regarding the moving object included in the image data based on the image data;
- a receiving unit configured to receive moving object information via a wireless communication from the moving object; and
- a comparing unit configured to compare the estimation information extracted by the analyzing unit and the moving object information received by the receiving unit,
- wherein, in a case where the estimation information and the moving object information are not matched in the comparing unit, the display unit displays a warning in addition to the image data.

9. A vessel comprising the imaging system according to claim 8.

* * * * *